United States Patent

Wang

(10) Patent No.: US 11,854,121 B2
(45) Date of Patent: Dec. 26, 2023

(54) WATER RIPPLE EFFECT IMPLEMENTING METHOD AND APPARATUS, ELECTRONIC DEVICE, AND COMPUTER READABLE STORAGE MEDIUM

(71) Applicant: BEIJING BYTEDANCE NETWORK TECHNOLOGY CO., LTD., Beijing (CN)

(72) Inventor: Jingye Wang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 38 days.

(21) Appl. No.: 17/635,629

(22) PCT Filed: Aug. 4, 2020

(86) PCT No.: PCT/CN2020/106858
§ 371 (c)(1),
(2) Date: Feb. 15, 2022

(87) PCT Pub. No.: WO2021/031846
PCT Pub. Date: Feb. 25, 2021

(65) Prior Publication Data
US 2022/0292734 A1    Sep. 15, 2022

(30) Foreign Application Priority Data

Aug. 16, 2019    (CN) .......................... 201910759026.7

(51) Int. Cl.
*G06T 11/00* (2006.01)
*G06T 11/40* (2006.01)

(52) U.S. Cl.
CPC ............ *G06T 11/001* (2013.01); *G06T 11/40* (2013.01); *G06T 2207/10024* (2013.01)

(58) Field of Classification Search
CPC ................... G06T 11/001; G06T 11/40; G06T 2207/10024; G06T 11/00; G06T 2207/10016
See application file for complete search history.

(56) References Cited

U.S. PATENT DOCUMENTS

| 6,377,712 B1 | 4/2002 | Georgiev et al. |
| 7,312,805 B1* | 12/2007 | Worthington ......... G06T 3/0093 345/647 |
| 9,336,604 B2* | 5/2016 | Murarka ................. G06T 7/593 |

FOREIGN PATENT DOCUMENTS

| CN | 101814006 A | 8/2010 |
| CN | 102592296 A | 7/2012 |

(Continued)

OTHER PUBLICATIONS

Alain Fournier and William T. Reeves. 1986. A simple model of ocean waves. In Proceedings of the 13th annual conference on Computer graphics and interactive techniques (SIGGRAPH '86). Association for Computing Machinery, New York, NY, USA, 75-84. (Year: 1986).*

(Continued)

*Primary Examiner* — Motilewa Good-Johnson
(74) *Attorney, Agent, or Firm* — BakerHostetler

(57) ABSTRACT

A method and apparatus for implementing a water ripple effect, an electronic device, and a computer readable storage medium are provided. The method obtaining a current image frame in an original video; selecting a water ripple map corresponding to the current image frame from a pre-obtained water ripple map sequence; determining displacements of respective pixels in the water ripple map, and forming a displacement vector diagram by using the displacements of the pixels; determining coordinates of respective pixels in the current image frame based on the displacement vector diagram to obtain a first water ripple distortion (Continued)

image; and determining a water ripple effect image corresponding to the current image frame based on the first water ripple distortion image and the water ripple map.

19 Claims, 3 Drawing Sheets

(56) References Cited

FOREIGN PATENT DOCUMENTS

| | | |
|---|---|---|
| CN | 103765297 A | 4/2014 |
| CN | 104571887 A | 4/2015 |
| CN | 105046726 A | 11/2015 |
| CN | 105913471 A | 8/2016 |
| CN | 107770606 A | 3/2018 |
| CN | 109598777 A | 4/2019 |
| WO | WO-2011134306 A1 * | 11/2011 ............. G06T 13/60 |

OTHER PUBLICATIONS

International Patent Application No. PCT/CN2020/106858; Int'l Written Opinion and Search Report; dated Nov. 6, 2020; 5 pages.
Feng et al.; "Research on Dynamic Water Surface and Ripple Animation"; I.J. Information Technology and Computer Science; vol. 1 2010; p. 18-24.

* cited by examiner

WATER RIPPLE EFFECT IMPLEMENTING METHOD AND APPARATUS, ELECTRONIC DEVICE, AND COMPUTER READABLE STORAGE MEDIUM

The present application is the national phase of International Application No. PCT/CN2020/106858, titled "WATER RIPPLE EFFECT IMPLEMENTING METHOD AND APPARATUS, ELECTRONIC DEVICE, AND COMPUTER READABLE STORAGE MEDIUM", filed on Aug. 4, 2020, which claims priority to Chinese Patent Application No. 201910759026.7, titled "WATER RIPPLE EFFECT IMPLEMENTING METHOD AND APPARATUS, ELECTRONIC DEVICE, AND COMPUTER READABLE STORAGE MEDIUM", filed on Aug. 16, 2019 with the China National Intellectual Property Administration, both of which are incorporated herein by reference in their entireties.

FIELD

The present disclosure relates to the technical field of image processing, and in particular, to a method and an apparatus for implementing a water ripple effect, an electronic device and a computer-readable storage medium.

BACKGROUND

With the development of intelligent terminal technologies, intelligent terminals are provided with increasingly diversified functions. For example, a user may use a terminal to perform live broadcast or shoot a short video. During the live broadcast or when shooting the short video, simulating a water ripple effect is a very interesting interactive entertainment.

In the conventional technology, two major manners are adopted to implement the water ripple effect. In a first manner, a video sequence having the water ripple effect is superposed on the original video. During the superposition, the video sequence having the water ripple effect and having a low transparency is superposed on the original video. In the second manner, the effect of a water droplet dropping into a water surface is simulated. For example, a trigonometric function is used to control distortion of the image, and the twist effect is a circle having a radius increasing over time and an amplitude decaying over time.

However, the above implementation manners have some defects. In the first manner, there is no connection between the original video and the video sequence having the water ripple effect, resulting an unnatural effect. In the second method, in the actual scene, it is difficult to realistically simulate the reflection of the water ripple effect in actual scenarios.

SUMMARY

This summary section is provided to introduce concepts in a simplified form that are described in detail in the embodiment section that follows. This summary section is not intended to identify key features or essential features of the claimed technical solution, nor is it intended to be used to limit the scope of the claimed technical solution.

The technical problem solved by the present disclosure is to provide a method for implementing a water ripple effect, so as to at least partially solve the technical problem of the unnatural and unrealistic water ripple effect in the conventional technology. In addition, an apparatus for implementing a water ripple effect, a hardware device for implementing a water ripple effect, a computer-readable storage medium and a terminal for implementing a water ripple effect are further provided.

In order to achieve the above object, according to one aspect of the present disclosure, the following technical solutions are provided.

A method for implementing a water ripple effect is provided, including:
obtaining a current image frame in an original video;
selecting a water ripple map corresponding to the current image frame from a pre-obtained water ripple map sequence;
determining displacements of respective pixels in the water ripple map, and forming a displacement vector diagram by using the displacements of the pixels;
determining coordinates of respective pixels in the current image frame based on the displacement vector diagram to obtain a first water ripple distortion image; and
determining a water ripple effect image corresponding to the current image frame based on the first water ripple distortion image and the water ripple map.

In order to achieve the above object, according to one aspect of the present disclosure, the following technical solutions are provided.

An apparatus for implementing a water ripple effect is provided, including:
an image obtaining module configured to obtain a current image frame in an original video;
a map selection module configured to select a water ripple map corresponding to the current image frame from a pre-obtained water ripple map sequence;
a vector image determination module configured to determine displacements of respective pixels in the water ripple map, and forming a displacement vector diagram by using the displacements of the pixels;
a distortion image determination module configured to determine coordinates of pixels in the current image frame according to the displacement vector diagram to obtain a first water ripple distortion image; and
a water ripple image determination module configured to determine a water ripple effect image corresponding to the current image frame based on the first water ripple distortion image and the water ripple map.

In order to achieve the above object, according to one aspect of the present disclosure, the following technical solutions are provided.

An electronic device is provided, including:
a memory configured to store non-transitory computer-readable instructions; and
a processor, configured to execute the computer-readable instructions, where the processor implements the method for implementing the water ripple effect according to any one of the above aspects when executing the computer-readable instructions.

In order to achieve the above object, according to one aspect of the present disclosure, the following technical solutions are provided.

A computer-readable storage medium storing non-transitory computer-readable instructions is provided. The non-transitory computer-readable instructions, when executed by a computer, cause the computer to perform the method for implementing the water ripple effect according to any one of the above aspects.

In order to achieve the above object, according to one aspect of the present disclosure, the following technical solutions are provided.

A terminal for implementing a water ripple effect is provided. The terminal includes the apparatus for implementing a water ripple effect according to any one of the above aspects.

According to the embodiments of the present disclosure, displacements of respective pixels in a water ripple map are determined and are used to form a displacement vector diagram. Coordinates of respective pixels in a current image frames are determined based on the displacement vector diagram, to obtain a first water ripple distortion image. A water ripple effect image is determined based on the first water ripple distortion image and the displacement vector diagram, to obtain an image having a realistic and aesthetically pleasing water ripple effect.

The above description is only an overview of the technical solutions of the present disclosure. In order to understand the technical means of the present disclosure more clearly, such that the technical means of the present disclosure can be implemented according to the content of the description, and to make the above and other purposes, features and advantages of the present disclosure more obvious and easy to understand, the following preferred embodiments are described in detail and in conjunction with the accompanying drawings as follows.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

DESCRIPTION OF EMBODIMENTS

Figure 1:
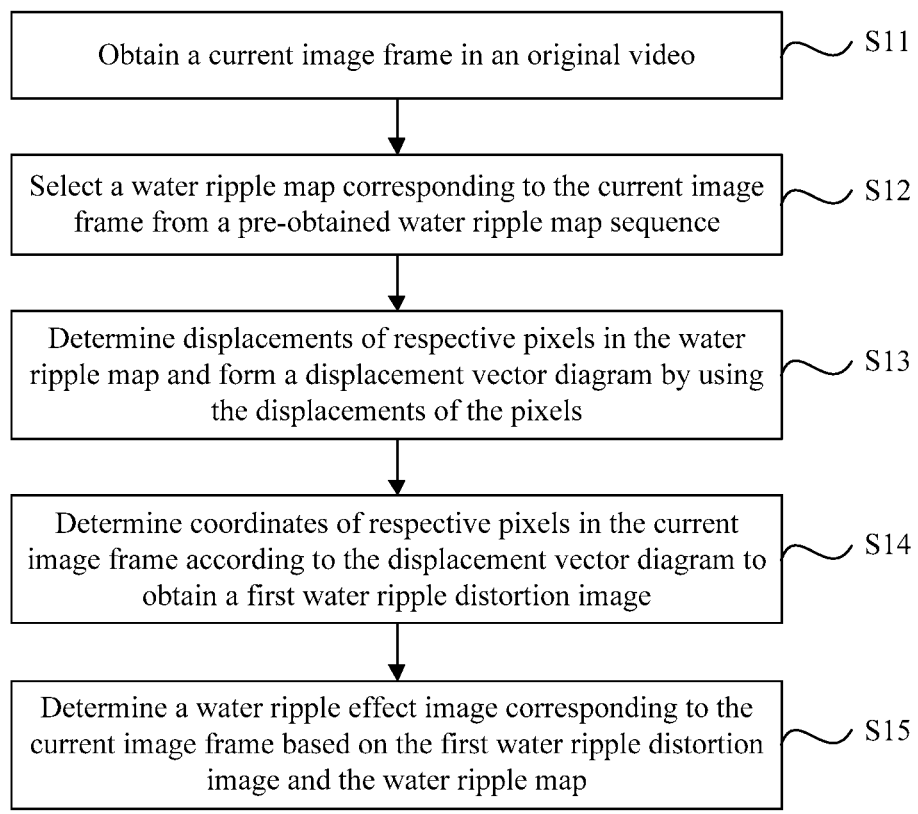
FIG. 1 is a flowchart of a method for implementing a water ripple effect according to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Instead, the embodiments are provided for the purpose of a more thorough and complete understanding of the present disclosure. It should be understood that the drawings and embodiments of the present disclosure are only for exemplary purposes, and are not intended to limit the scope of the present disclosure.

It should be understood that the various steps described in the method embodiments of the present disclosure may be performed in different orders and/or in parallel. Furthermore, method embodiments may include additional steps and/or omit performing the illustrated steps. The scope of the present disclosure is not limited in this regard.

As used herein, the term "including" and variations thereof are open-ended inclusions, that is, "including but not limited to". The term "based on" means "based at least in part on." The term "one embodiment" means "at least one embodiment"; the term "another embodiment" means "at least one additional embodiment"; the term "some embodiments" means "at least some embodiments". Relevant definitions of other terms will be given in the description below.

Embodiment 1

In order to solve the technical problem of the unnatural and unrealistic water ripple effect in the conventional technology, a method for implementing a water ripple effect is provided according to an embodiment of the present disclosure.

As shown in FIG. 1, the method for implementing a water ripple effect includes the following steps S11 to S15.

In step S11, a current image frame in an original video is obtained.

The original video may be a video stream inputted in a real time manner, such as a live video in a short video application, or a video image pre-stored in the terminal. The terminal may be a mobile terminal, such as a smart phone or a tablet computer, or a fixed terminal, such as a desktop computer.

The current image frame is an image that is played at a current time instant, where the current time instant may be set by the user. Specifically, the original video is obtained first, and then an image played at a current time instant, that is, the current image frame, is determined according to a current playback progress of the original video. For example, a video image is displayed on the terminal screen for playback, and when the user has a demand for or sees an image of interest, the user may obtain the current image frame by triggering a corresponding button.

In step S12, a water ripple map corresponding to the current image frame is selected from a pre-obtained water ripple map sequence.

The water ripple map is an image including water ripples. Specifically, the water ripple map sequence may be obtained from the internet. The number of water ripple maps in the water ripple map sequence is the same as the number of image frames to be processed in the original video. That is, each of the image frames of original video corresponds to one of the water ripple maps.

In step S13, displacements of respective pixels in the water ripple map is determined, and a displacement vector diagram is formed by the displacements of the pixels.

Specifically, each of the pixels in the water ripple map is moved, and the displacement vector diagram is formed by displacements of respective pixels.

In step S14, coordinates of respective pixels in the current image frame are determined based on the displacement vector diagram to obtain a first water ripple distortion image.

The displacement vector diagram includes the displacement of each of the pixels, and each of the pixels in the current image frame is moved according to the displacement of one of the pixels in the displacement vector diagram to obtain a new image, that is, the first water ripple distorted image.

In step S15, a water ripple effect image corresponding to the current image frame is determined based on the first water ripple distortion image and the water ripple map.

In this embodiment, displacements of respective pixels in a water ripple map is determined, a displacement vector diagram is formed by the displacements of the pixels, coordinates of respective pixels in the current image frame are determined according to the displacement vector diagram to obtain the first water ripple effect image, and a water ripple effect image is determined based on the first water ripple distortion image and the water ripple map, so as to obtain an image having a realistic and aesthetically pleasing water ripple effect.

In an optional embodiment, step S13 includes the following steps S131 to 135.

In step S131, the pixels in the water ripple map are traversed, and a traversed pixel among the pixels is used as a current pixel.

In step S132, a preset image region that uses the current pixel as a reference point is determined.

The reference point may be a central point.

The preset image region may be customized. For example, the preset image region may be a square region with the current pixel as the central point.

In step S133, a pixel in the preset image region is selected as a target pixel.

In step S134, a displacement of the current pixel is determined based on the current pixel and the target pixel.

In step S135, the displacement vector diagram is formed by using displacements of all current pixels that are traversed in the water ripple map.

In an optional embodiment, step S134 includes the following steps S1341 to S1343.

In step S1341, first coordinates of the current pixel and second coordinate of the target pixel are determined.

In step S1342, a first color value of the current pixel in a preset color channel and a second color value of the target pixel in the preset color channel are determined.

The preset color channel may be an L channel of a Lab color space. The Lab color space includes three elements, including luminance (L), and two color channels a and b. a includes colors from dark green (a low lightness value) to gray (a medium lightness value), then to bright pink (a high lightness value), b includes colors from light blue (a low lightness value) to gray (a medium lightness value 0), then to yellow (a high brightness value).

In step S1343, the displacement of the current pixel is obtained based on the first coordinates, the second coordinates, the first color value and the second color value.

In an optional embodiment, step S1343 includes:
obtaining a square of a distance between the current pixel and the target pixel based on the first coordinates and the second coordinates;
determining a relative displacement between the current pixel and the target pixel based on the first coordinates and the second coordinates;
calculating a difference between the second color value and the first color value; and
determining the displacement of the current pixel based on the square, the relative displacement and the difference.

In an optional embodiment, the determining the displacement of the current pixel based on the square, the relative displacement and the difference includes:
determining the displacement of the current pixel by using the following equation:

$$V_p = \sum_{q \in w} \alpha(L_q - L_p) \frac{1}{\|q - p\|} V_{pq},$$

where p represents the coordinates of the current pixel, $V_p$ represents the displacement of the current pixel, q represents the coordinates of the target pixel, $V_{pq}$ represents the relative displacement, w represents the preset image region, $\alpha$ represents a parameter, $\|\cdot\|$ represents obtaining an absolute value, and $\Sigma$ represents summation.

In an optional embodiment, step S15 includes the following steps S151 to S153.

In step S151, the first water ripple distortion image is filtered to obtain a second water ripple distortion image having a preset tone.

The preset tone may be customized to be, for example, a blue tone.

In step S152, a color of the water ripple map is processed to obtain a colored water ripple map.

Specifically, if the water ripple map is a black and white image or a gray image, a color of the water ripple map is processed to obtain a colored water ripple map. For example, the color of the water ripple map may be processed to obtain a water ripple map having a blue tone.

In step S153, the water ripple effect image corresponding to the current image frame is determined based on the second water ripple distortion image and the colored water ripple map.

In an optional embodiment, step S151 includes the following steps S1511 and S1512.

In step S1511, at least one color channel corresponding to each of pixels in the first water ripple distortion image is determined.

For example, if the first water ripple distortion image is an RGB (red, green and blue) image, the corresponding at least one color channel includes an R channel, a G channel, and a B channel.

In step S1512, a color component of each of the at least one color channel is multiplied by a preset coefficient, to obtain the second water ripple distorting image having the preset tone.

The preset coefficient may be customized, and each color channel corresponds to a different preset coefficient.

In an optional embodiment, step S152 includes:
multiplying the water ripple map with a selected preset color to obtain the colored water ripple map.

The preset color may be a blue color.

The multiplying includes blending a color of each of the pixels in the water ripple map with the selected preset color.

In an optional embodiment, step S153 includes:
multiplying and blending the second water ripple distortion image with the colored water ripple map to obtain the water ripple effect image corresponding to the current image frame.

The multiplying and blending is a combination of multiplying and color filtering.

Embodiment 2

Figure 2:
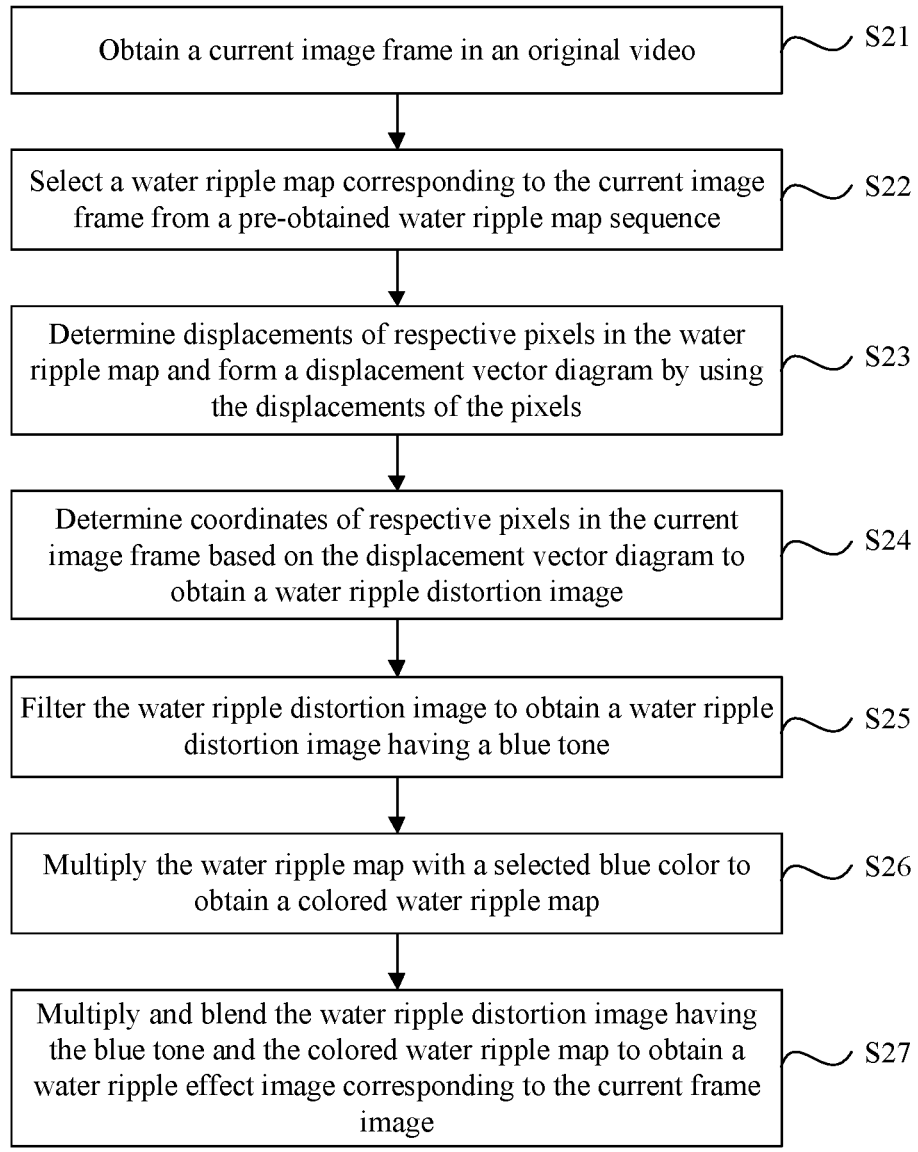
FIG. 2 is a flowchart of a method for implementing a water ripple effect according to an embodiment of the present disclosure.

An implementation is provided in this embodiment for explaining the present disclosure. As shown in FIG. 2, the method for implementing a water ripple effect includes the following steps S21 to S25.

In step S21: a current image frame in an original video is obtained.

In step S22, a water ripple map corresponding to the current image frame is elected from a pre-obtained water ripple map sequence.

Specifically, an AE (Adobe After Effects, graphics and video processing) application may be used first to obtain a delicate, natural and aesthetically pleasing water ripple map sequence, where each original map of the water ripple map sequence is black and white. Next, soft linear fractal noise is applied to obtain the water ripple map sequence.

In step S23, displacements of respective pixels in the water ripple map are determined and a displacement vector diagram is formed by using the displacements of the pixels.

The displacement of a current pixel is determined by using the following equation:

$$V_p = \sum_{q \in w} \alpha(L_q - L_p)\frac{1}{\|q - p\|}V_{pq},$$

where p represents coordinates of the current pixel, $V_p$ represents a displacement of the current pixel, q represents coordinates of a target pixel, $V_{pq}$ represents a relative displacement, w represents a preset image region, $\alpha$ represents a parameter, $\|\cdot\|$ represents obtaining an absolute value, and $\Sigma$ represents summation. $\alpha$ may have a value of 0.06.

In addition, horizontal and vertical displacement offsets are required to be limited to 4 to 30 pixels, to prevent excessively small offsets, thereby effectively avoiding burrs, and prevent excessively large offsets, thereby avoiding over-distortion, so as to obtain the diagram having the distortion effect.

In step S24, coordinates of respective pixels in the current image frame are determined based on the displacement vector diagram to obtain a water ripple distortion image.

In step S25, the water ripple distortion image is filtered to obtain a water ripple distortion image having a blue tone.

Specifically, the RGB channel values of each of the pixels are respectively multiplied by three values of 0.80, 0.88 and 1.1, such that the water ripple distortion image has a blue tone, so as to obtained a blue-toned distortion image.

In step S26, the water ripple map is multiplied with a selected blue color to obtain a colored water ripple map.

In step S27, the water ripple distortion image having the blue tone and the colored water ripple map are multiplied and blended to obtain a water ripple effect image corresponding to the current image frame.

Those skilled in the art should understand that on the basis of the above-mentioned various embodiments, obvious modifications (for example, combinations of the listed modes) or equivalent substitutions can be made.

Although the steps of the method embodiments are described in the above order, those skilled in the art should understand that the steps according to the embodiments of the present disclosure are not necessarily executed in the above order, and they may be performed in a reversed, parallel, interleaved manner or other orders. Besides, on the basis of the above steps, those skilled in the art may add other steps. These obvious modifications or equivalents shall fall within the protection scope of the present disclosure, and are not described in detail herein.

The following described are apparatus embodiments according to the present disclosure. The apparatus embodiments may perform the steps implemented through the method embodiments of the present disclosure. For ease of description, only the parts related to the embodiments of the present disclosure are shown. For specific technical details that are not disclosed, please refer to the method embodiments of the present disclosure.

Embodiment 3

Figure 3:
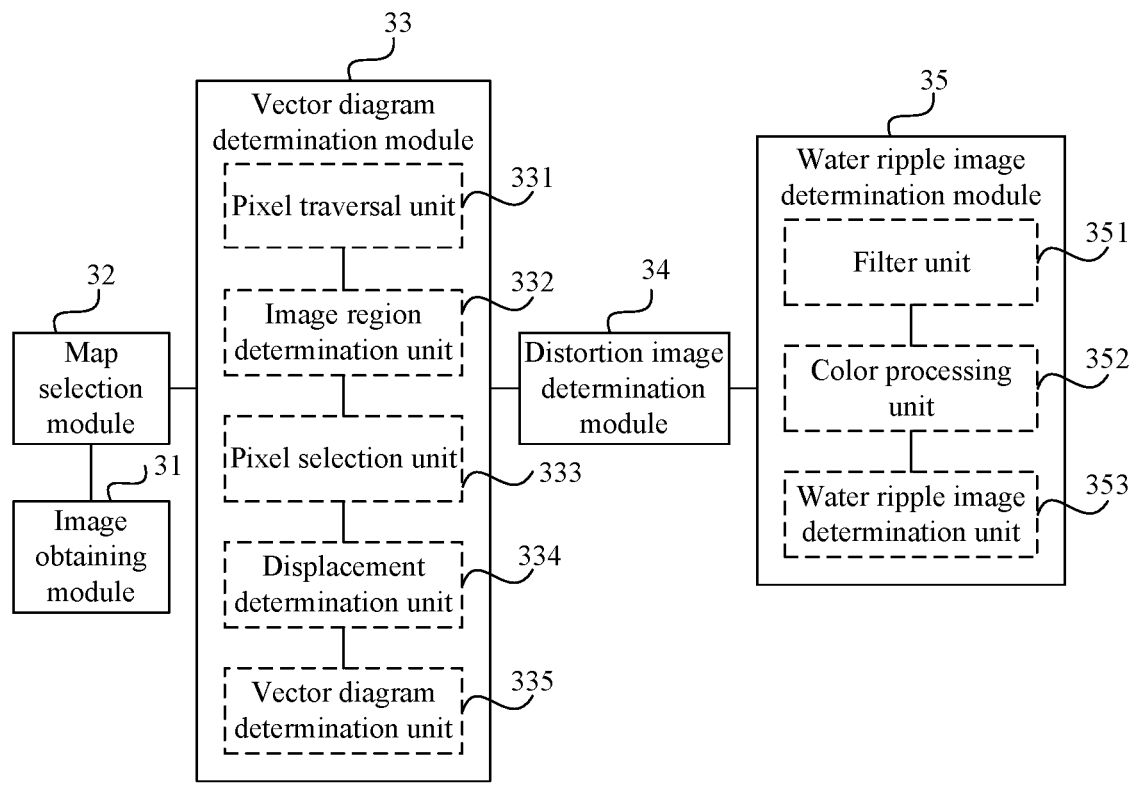
FIG. 3 is a flowchart of an apparatus for implementing a water ripple effect according to an embodiment of the present disclosure.

In order to solve the technical problem of unnatural and unrealistic water ripple effect in the conventional technology, an apparatus for implementing a water ripple effect is provided according to an embodiment of the present disclosure. The apparatus may perform the steps in the embodiments of the method for implementing a water ripple effect described in the above Embodiment 1. As shown in FIG. 3, the apparatus includes: an image obtaining module 31, a map selection module 32, a vector diagram determination module 33, a distortion image determination module 34 and a water ripple image determination module 35.

The image obtaining module 31 is configured to obtain a current image frame in an original video.

The map selection module 32 is configured to select a water ripple map corresponding to the current image frame from a pre-obtained water ripple map sequence.

The vector diagram determination module 33 is configured to determine displacements of respective pixels in the water ripple map, and form a displacement vector diagram by using the displacements of the pixels.

The distortion image determination module 34 is configured to determine coordinates of respective pixels in the current image frame based on the displacement vector diagram to obtain a first water ripple distortion image.

The water ripple image determination module 35 is configured to determine a water ripple effect image corresponding to the current image frame based on the first water ripple distortion image and the water ripple map.

Further, the vector diagram determination module 33 includes a pixel traversal unit 331, an image region determination unit 332, a pixel selection unit 333, a displacement determination unit 334, and a vector diagram determination unit 335.

The pixel traversal unit 331 is configured to traverse the pixels in the water ripple map, and use a traversed pixel among the pixels as a current pixel.

The image region determination unit 332 is configured to determine a preset image region that uses the current pixel as a reference point.

The pixel selection unit 333 is configured to select a pixel in the preset image region as a target pixel.

The displacement determination unit 334 is configured to determine a displacement of the current pixel based on the current pixel and the target pixel.

The vector diagram determination unit 335 is configured to form the displacement vector diagram by using displacements of all current pixels that are traversed in the water ripple map.

Further, the displacement determination unit 334 is configured to determine first coordinates of the current pixel and second coordinate of the target pixel; determine a first color value of the current pixel in a preset color channel and a second color value of the target pixel in the preset color channel; and obtain the displacement of the current pixel based on the first coordinates, the second coordinates, the first color value and the second color value.

Further, the displacement determination unit 334 is configured to obtain a square of a distance between the current pixel and the target pixel based on the first coordinates and the second coordinates; determine a relative displacement between the current pixel and the target pixel based on the first coordinates and the second coordinates; calculate a difference between the second color value and the first color value; and determine the displacement of the current pixel based on the square, the relative displacement and the difference.

Further, the displacement determination unit 334 is configured to determining the displacement of the current pixel by using the following equation:

$$V_p = \sum_{q \in w} \alpha(L_q - L_p) \frac{1}{\|q - p\|} V_{pq},$$

where p represents the coordinates of the current pixel, $V_p$ represents the displacement of the current pixel, q represents the coordinates of the target pixel, $V_{pq}$ represents the relative displacement, w represents the preset image region, α represents a parameter, $\|\cdot\|$ represents obtaining an absolute value, and Σ represents summation.

Further, the water ripple image determination module 35 includes a filter unit 351, a color processing unit 352, and a water ripple image determination unit 353.

The filter unit 351 is configured to filter the first water ripple distortion image to obtain a second water ripple distortion image having a preset tone.

The color processing unit 352 is configured to process a color of the water ripple map to obtain a colored water ripple map.

The water ripple image determination unit 353 is configured to determine the water ripple effect image corresponding to the current image frame based on the second water ripple distortion image and the colored water ripple map.

Further, the filter unit 351 is configured to determine at least one color channel corresponding to each of pixels in the first water ripple distortion image; and multiply a color component of each of the at least one color channel by a preset coefficient, to obtain the second water ripple distorting image having the preset tone.

Further, the color processing unit 352 is configured to multiply the water ripple map with a selected preset color to obtain the colored water ripple map.

Further, the water ripple image determination unit 353 is configured to multiply and blend the second water ripple distortion image with the colored water ripple map to obtain the water ripple effect image corresponding to the current image frame.

Embodiment 4

Figure 4:
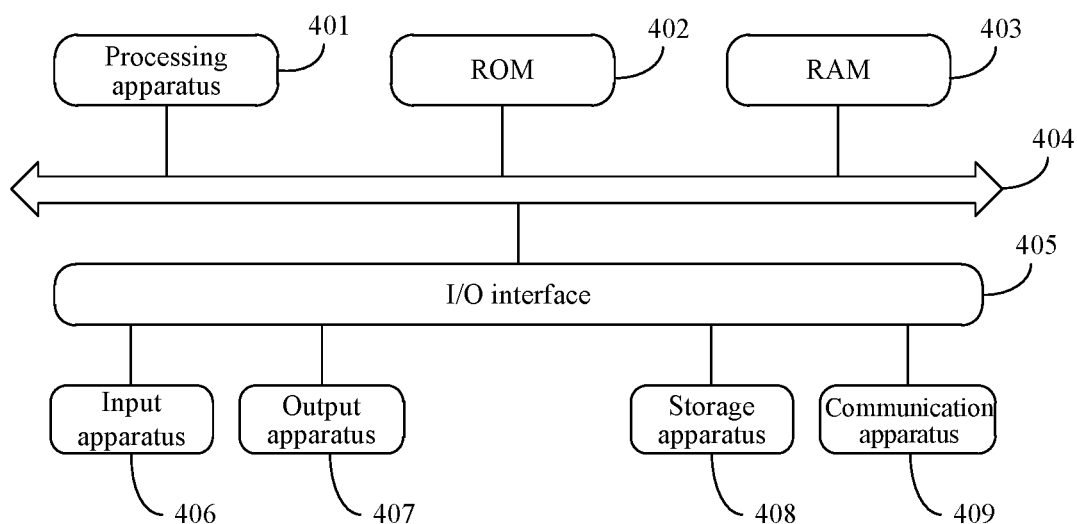
FIG. 4 is a schematic structural diagram of an electronic device according to an embodiment of the present disclosure.

Reference is made to FIG. 4, which shows a schematic structural diagram of an electronic device 400 suitable for implementing the embodiments of the present disclosure. The terminal device according to the embodiments of the present disclosure may include, but is not limited to, a mobile terminal such as a mobile phone, a laptop computer, a digital broadcast receiver, a PDA (a personal digital assistant), a PAD (a tablet), a PMP (a portable multimedia player), a vehicle-mounted terminal (such as an in-vehicle navigation terminal), and the like, and a fixed terminal such as a digital TV, a desktop computer, and the like. The electronic device shown in FIG. 4 is only exemplary, and should not indicate any limitation to the function and scope of application of the embodiments of the present disclosure.

As shown in FIG. 4, the electronic device 400 may include a processing apparatus 401, such as a central processing unit (CPU) or a graphics processor, which can execute various appropriate actions and processes based on a program stored in a Read Only Memory (ROM) 402 or a program loaded from a storage apparatus 406 into a Random Access Memory (RAM) 403. In the RAM 403, various programs and data required by the electronic device 400 for operation are further stored. The processing apparatus 401, the ROM 402, and the RAM 403 are connected to each other through a bus 404. An input/output (I/O) interface 405 is also connected to the bus 404.

Generally, the following may be connected to the I/O interface 405: an input apparatus 406 such as a touch screen, a touch pad, a keyboard, a mouse, a camera, a microphone, an accelerometer, a gyroscope, an output apparatus 407 such as a Liquid Crystal Display (LCD), a speaker, a vibrator, a storage apparatus 406 such as a magnetic tape, a hard disk, and a communication apparatus 409. Based on the communication apparatus 409, the electronic device 400 may communicate with other devices through wired or wireless communication to exchange data. Although FIG. 4 shows the electronic device 400 including various apparatuses, it should be understood that not all shown apparatuses are required to be implemented or included. The shown apparatuses may be replaced by other apparatuses, or more or less apparatuses may be included.

In particular, the processes, described above with reference to flow charts, may be implemented as a computer software program according to an embodiment of the present disclosure. For example, a computer program product is provided according to an embodiment of the present disclosure, the computer program product includes a computer program embodied on a non-transitory computer readable medium. The computer program includes program codes for performing the method shown in the flowchart. In such embodiments, the computer program may be downloaded and installed from the network through the communication apparatus 409, installed from the storage apparatus 406, or installed from the ROM 402. The computer program, when being executed by the processing apparatus 401, performs functions defined in the method according to the embodiments of the present disclosure.

It should be noted that the computer readable medium provided according to the present disclosure, may be a computer readable signal medium or a computer readable storage medium or any combination of the two. The computer readable storage medium can be, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a Random-Access Memory (RAM), a Read-Only Memory (ROM), an Erasable Programmable Read-Only Memory (EPROM or Flash memory), an optical fiber, a portable Compact Disk Read-Only Memory (CD-ROM), an optical storage device, a magnetic storage device, or any suitable combination of the foregoing. In the present disclosure, the computer readable storage medium can be any tangible medium containing or storing a program, where the program can be used by an instruction execution system, apparatus or device or used in combination therewith. In the present disclosure, the computer readable signal medium may include a data signal transmitted in a baseband or transmitted as a part of a carrier wave. The data signal carries computer readable program codes. The transmitted data signal may has a variety of forms including, but not limited to, an electromagnetic signal, an optical signal, or any suitable combination of the above. The computer readable signal medium may also be any other computer readable medium except for the computer readable storage medium. The computer readable signal medium can send, transmit or transfer programs used by an instruction execution system, an instruction execution apparatus and an instruction execution device or used in combination with the instruction execution system, the instruction execution apparatus and the instruction execution device. The program codes included in the computer readable medium may be transferred through any proper medium including, but not limited to, an electric wire, an optical cable, RF (Radio Frequency), and the like, and any proper combination of the above.

In some embodiments, the client and the server can communicate by using any currently known or future developed network protocol such as HTTP (Hyper Text Transfer Protocol), and can be interconnected with digital data communication in any form or medium (for example, a communication network). Examples of the communication network include Local Area Network ("LAN"), Wide Area Network ("WAN"), an internet (for example, the Internet), and an end-to-end network (for example, the ad hoc end-to-end network), as well as any currently known or future developed network.

The computer readable medium may be included in the electronic apparatus. Alternatively, the computer readable medium may exist independently and not assembled in the electronic apparatus.

The computer readable medium may carry one or more programs. The electronic apparatus, when executing the one or more programs, cause the electronic apparatus to: obtaining a current image frame in an original video; selecting a water ripple map corresponding to the current image frame from a pre-obtained water ripple map sequence; determining displacements of respective pixels in the water ripple map, and forming a displacement vector diagram by using the displacements of the pixels; determining coordinates of respective pixels in the current image frame based on the displacement vector diagram to obtain a first water ripple distortion image; and determining a water ripple effect image corresponding to the current image frame based on the first water ripple distortion image and the water ripple map.

The computer program codes for performing the operations according to the present disclosure may be written in at least one programming language or a combination of the at least one programming language. The programming language includes, but is not limited to, an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowcharts and block diagrams in the drawings show architectures, functions and operations that may be realized with the systems, methods and computer program products according to the embodiments of the present disclosure. Each block in the flowcharts or block diagrams may represent a module, a program segment or a part of codes. The module, the program segment or the part of codes includes one or more executable instructions for implementing a specified logical function. It should be noted that in some substitution implementations, functions indicated in the blocks may also occur in an order different from that indicated in the drawings. For example, two steps respectively indicated in two blocks that are connected to each other in an order may be implemented in parallel. Sometimes the two steps may be implemented in a reverse order, which depends on a function related to the steps. It should also be noted that each block in the block diagrams and/or flowcharts and a combination of blocks in the block diagrams and/or flowcharts may be implemented by a special hardware-based system for performing a specified function or operation or implemented by a combination of a special hardware and a computer instruction.

Units involved in the embodiments of the present disclosure may be implemented by software or by hardware. The names of the units do not in any way constitute a limitation on the unit itself.

The functions described hereinabove may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Parts (ASSP), System on Chip (SOC), Complex Programmable Logical device (CPLD), and the like.

In the context of the present disclosure, a machine-readable medium may be a tangible medium, which may contain or store a program for use by an instruction execution system, apparatus, or device or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include an electrical connection based on one or more wires, a portable computer disk, a hard disk, a Random Access Memory (RAM), a Read-Only Memory (ROM), an Erasable Programmable Read-Only Memory (EPROM or flash memory), an optical fiber, a Portable Compact Disk Read-Only Memory (CD-ROM), an optical storage device, a magnetic storage device, or any suitable combination of the foregoing.

According to one or more embodiments of the present disclosure, an image processing method is provided, with includes:
  obtaining a current image frame in an original video;
  selecting a water ripple map corresponding to the current image frame from a pre-obtained water ripple map sequence;
  determining displacements of respective pixels in the water ripple map, and forming a displacement vector diagram by using the displacements of the pixels;
  determining coordinates of respective pixels in the current image frame based on the displacement vector diagram to obtain a first water ripple distortion image; and
  determining a water ripple effect image corresponding to the current image frame based on the first water ripple distortion image and the water ripple map.

Further, the determining displacements of respective pixels in the water ripple map, and forming a displacement vector diagram by using the displacements of the pixels includes:
  traversing the pixels in the water ripple map, and using a traversed pixel among the pixels as a current pixel;
  determining a preset image region that uses the current pixel as a reference point;

selecting a pixel in the preset image region as a target pixel;

determining a displacement of the current pixel based on the current pixel and the target pixel; and forming the displacement vector diagram by using displacements of all current pixels that are traversed in the water ripple map.

Further, the determining a displacement of the current pixel based on the current pixel and the target pixel includes:

determining first coordinates of the current pixel and second coordinate of the target pixel;

determining a first color value of the current pixel in a preset color channel and a second color value of the target pixel in the preset color channel; and obtaining the displacement of the current pixel based on the first coordinates, the second coordinates, the first color value and the second color value.

Further, the obtaining the displacement of the current pixel based on the first coordinates, the second coordinates, the first color value and the second color value includes:

obtaining a square of a distance between the current pixel and the target pixel based on the first coordinates and the second coordinates;

determining a relative displacement between the current pixel and the target pixel based on the first coordinates and the second coordinates;

calculating a difference between the second color value and the first color value; and determining the displacement of the current pixel based on the square, the relative displacement and the difference.

Further, the determining the displacement of the current pixel based on the square, the relative displacement and the difference includes:

determining the displacement of the current pixel by using the following equation:

$$V_p = \sum_{q \in w} \alpha(L_q - L_p) \frac{1}{\|q - p\|} V_{pq},$$

where p represents the coordinates of the current pixel, $V_p$ represents the displacement of the current pixel, q represents the coordinates of the target pixel, $V_{pq}$ represents the relative displacement, w represents the preset image region, $\alpha$ represents a parameter, $\|\cdot\|$ represents obtaining an absolute value, and $\Sigma$ represents summation.

Further, the determining a water ripple effect image corresponding to the current image frame based on the first water ripple distortion image and the water ripple map includes:

filtering the first water ripple distortion image to obtain a second water ripple distortion image having a preset tone;

processing a color of the water ripple map to obtain a colored water ripple map; and determining the water ripple effect image corresponding to the current image frame based on the second water ripple distortion image and the colored water ripple map.

Further, the filtering the first water ripple distortion image to obtain a second water ripple distortion image having a preset tone includes:

determining at least one color channel corresponding to each of pixels in the first water ripple distortion image; and multiplying a color component of each of the at least one color channel by a preset coefficient, to obtain the second water ripple distorting image having the preset tone.

Further, the processing a color of the water ripple map to obtain a colored water ripple map includes:

multiplying the water ripple map with a selected preset color to obtain the colored water ripple map.

Further, the determining the water ripple effect image corresponding to the current image frame based on the second water ripple distortion image and the colored water ripple map includes:

According to one or more embodiments of the present disclosure, an image processing apparatus is provided, with includes:

an image obtaining module configured to obtain a current image frame in an original video;

a map selection module configured to select a water ripple map corresponding to the current image frame from a pre-obtained water ripple map sequence;

a vector diagram determination module configured to determine displacements of respective pixels in the water ripple map, and form a displacement vector diagram by using the displacements of the pixels;

a distortion image determination module configured to determine coordinates of respective pixels in the current image frame based on the displacement vector diagram to obtain a first water ripple distortion image; and a water ripple image determination module configured to determine a water ripple effect image corresponding to the current image frame based on the first water ripple distortion image and the water ripple map.

Further, the vector diagram determination module includes:

a pixel traversal unit configured to traverse the pixels in the water ripple map, and use a traversed pixel among the pixels as a current pixel;

an image region determination unit configured to determine a preset image region that uses the current pixel as a reference point;

a pixel selection unit configured to select a pixel in the preset image region as a target pixel;

a displacement determination unit configured to determine a displacement of the current pixel based on the current pixel and the target pixel; and a vector diagram determination unit configured to form the displacement vector diagram by using displacements of all current pixels that are traversed in the water ripple map.

Further, the displacement determination unit is configured to determine first coordinates of the current pixel and second coordinate of the target pixel; determine a first color value of the current pixel in a preset color channel and a second color value of the target pixel in the preset color channel; and obtain the displacement of the current pixel based on the first coordinates, the second coordinates, the first color value and the second color value.

Further, the displacement determination unit is configured to obtain a square of a distance between the current pixel and the target pixel based on the first coordinates and the second coordinates; determine a relative displacement between the current pixel and the target pixel based on the first coordinates and the second coordinates; calculate a difference between the second color value and the first color value; and determine the displacement of the current pixel based on the square, the relative displacement and the difference.

Further, the displacement determination unit is configured to determining the displacement of the current pixel by using the following equation:

$$V_p = \sum_{q \in w} \alpha(L_q - L_p) \frac{1}{\|q - p\|} V_{pq},$$

where p represents the coordinates of the current pixel, $V_p$ represents the displacement of the current pixel, q represents the coordinates of the target pixel, $V_{pq}$ represents the relative displacement, w represents the preset image region, $\alpha$ represents a parameter, $\|\cdot\|$ represents obtaining an absolute value, and $\Sigma$ represents summation.

Further, the water ripple image determination module includes:
a filter unit configured to filter the first water ripple distortion image to obtain a second water ripple distortion image having a preset tone;
a color processing unit configured to process a color of the water ripple map to obtain a colored water ripple map; and
a water ripple image determination unit configured to determine the water ripple effect image corresponding to the current image frame based on the second water ripple distortion image and the colored water ripple map.

Further, the filter unit is configured to determine at least one color channel corresponding to each of pixels in the first water ripple distortion image; and multiply a color component of each of the at least one color channel by a preset coefficient, to obtain the second water ripple distorting image having the preset tone.

Further, the color processing unit is configured to multiply the water ripple map with a selected preset color to obtain the colored water ripple map.

Further, the water ripple image determination unit is configured to multiply and blend the second water ripple distortion image with the colored water ripple map to obtain the water ripple effect image corresponding to the current image frame.

According to one or more embodiments of the present disclosure, an electronic device is provided, which includes:
a memory configured to store non-transitory computer-readable instructions; and
a processor, configured to execute the computer-readable instructions, where the processor implements the above method for implementing a water ripple effect when executing the computer-readable instructions.

According to one or more embodiments of the present disclosure, a computer-readable storage medium is provided. The computer-readable storage medium stores non-transitory computer-readable instructions, and the non-transitory computer-readable instructions, when executed by a computer, cause the computer to perform the above method for implementing a water ripple effect.

The above are only preferred embodiments of the present disclosure and are illustrative of the technical principles applied in the present disclosure. It should be understood by those skilled in the art that the scope of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

In addition, although the operations are depicted in a specific order, it should not be understood as these operations are required to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or method logical actions, it should be understood that the subject matter defined in the appended claims is not necessarily limited to the specific features or actions described above. On the contrary, the specific features and actions described above are merely exemplary forms of implementing the claims.

The invention claimed is:

1. A method for implementing a water ripple effect, comprising:
obtaining a current image frame in an original video;
selecting a water ripple map corresponding to the current image frame from a pre-obtained water ripple map sequence;
determining displacements of respective pixels in the water ripple map, and forming a displacement vector diagram by using the displacements of the pixels;
determining coordinates of respective pixels in the current image frame based on the displacement vector diagram to obtain a first water ripple distortion image; and
determining a water ripple effect image corresponding to the current image frame based on the first water ripple distortion image and the water ripple map.

2. The method according to claim 1, wherein the determining displacements of respective pixels in the water ripple map, and forming a displacement vector diagram by using the displacements of the pixels comprising:
traversing the pixels in the water ripple map, and using a traversed pixel among the pixels as a current pixel;
determining a preset image region that uses the current pixel as a reference point;
selecting a pixel in the preset image region as a target pixel;
determining a displacement of the current pixel based on the current pixel and the target pixel; and
forming the displacement vector diagram by using displacements of all current pixels that are traversed in the water ripple map.

3. The method according to claim 2, wherein the determining a displacement of the current pixel based on the current pixel and the target pixel comprises:
determining first coordinates of the current pixel and second coordinate of the target pixel;
determining a first color value of the current pixel in a preset color channel and a second color value of the target pixel in the preset color channel; and obtaining the displacement of the current pixel based on the first coordinates, the second coordinates, the first color value and the second color value.

4. The method according to claim 3, wherein the obtaining the displacement of the current pixel based on the first coordinates, the second coordinates, the first color value and the second color value comprises:
  obtaining a square of a distance between the current pixel and the target pixel based on the first coordinates and the second coordinates;
  determining a relative displacement between the current pixel and the target pixel based on the first coordinates and the second coordinates;
  calculating a difference between the second color value and the first color value; and
  determining the displacement of the current pixel based on the square, the relative displacement and the difference.

5. The method according to claim 4, wherein the determining the displacement of the current pixel based on the square, the relative displacement and the difference comprises:
  determining the displacement of the current pixel by using the following equation:

$$V_p = \sum_{q \in w} \alpha(L_q - L_p) \frac{1}{\|q - p\|} V_{pq},$$

wherein p represents the coordinates of the current pixel, $V_p$ represents the displacement of the current pixel, q represents the coordinates of the target pixel, $V_{pq}$ represents the relative displacement, w represents the preset image region, a represents a parameter, $\|\cdot\|$ represents obtaining an absolute value, and $\Sigma$ represents summation.

6. The method according to claim 1, wherein the determining a water ripple effect image corresponding to the current image frame based on the first water ripple distortion image and the water ripple map comprises:
  filtering the first water ripple distortion image to obtain a second water ripple distortion image having a preset tone;
  processing a color of the water ripple map to obtain a colored water ripple map; and
  determining the water ripple effect image corresponding to the current image frame based on the second water ripple distortion image and the colored water ripple map.

7. The method according to claim 6, wherein the filtering the first water ripple distortion image to obtain a second water ripple distortion image having a preset tone comprises:
  determining at least one color channel corresponding to each of pixels in the first water ripple distortion image; and
  multiplying a color component of each of the at least one color channel by a preset coefficient, to obtain the second water ripple distorting image having the preset tone.

8. The method according to claim 6, wherein the processing a color of the water ripple map to obtain a colored water ripple map comprising:
  multiplying the water ripple map with a selected preset color to obtain the colored water ripple map.

9. The method according to claim 6, wherein the determining the water ripple effect image corresponding to the current image frame based on the second water ripple distortion image and the colored water ripple map comprises:
  multiplying and blending the second water ripple distortion image with the colored water ripple map to obtain the water ripple effect image corresponding to the current image frame.

10. An apparatus for implementing a water ripple effect, comprising:
  a memory configured to store non-transitory computer-readable instructions; and
  a processor, configured to execute the computer-readable instructions, wherein the processor, when executing the computer-readable instructions, implements operations comprising:
  obtaining a current image frame in an original video;
  selecting a water ripple map corresponding to the current image frame from a pre-obtained water ripple map sequence;
  determining displacements of respective pixels in the water ripple map, and forming a displacement vector diagram by using the displacements of the pixels;
  determining coordinates of pixels in the current image frame according to the displacement vector diagram to obtain a first water ripple distortion image; and
  determining a water ripple effect image corresponding to the current image frame based on the first water ripple distortion image and the water ripple map.

11. The apparatus according to claim 10, wherein the processor, when executing the computer-readable instructions, implements operations comprising:
  traversing the pixels in the water ripple map, and using a traversed pixel among the pixels as a current pixel;
  determining a preset image region that uses the current pixel as a reference point;
  selecting a pixel in the preset image region as a target pixel;
  determining a displacement of the current pixel based on the current pixel and the target pixel; and
  forming the displacement vector diagram by using displacements of all current pixels that are traversed in the water ripple map.

12. The apparatus according to claim 11, wherein the processor, when executing the computer-readable instructions, implements operations comprising:
  determining first coordinates of the current pixel and second coordinate of the target pixel;
  determining a first color value of the current pixel in a preset color channel and a second color value of the target pixel in the preset color channel; and
  obtaining the displacement of the current pixel based on the first coordinates, the second coordinates, the first color value and the second color value.

13. The apparatus according to claim 12, wherein the processor, when executing the computer-readable instructions, implements operations comprising:
  obtaining a square of a distance between the current pixel and the target pixel based on the first coordinates and the second coordinates;
  determining a relative displacement between the current pixel and the target pixel based on the first coordinates and the second coordinates;
  calculating a difference between the second color value and the first color value; and determining the displacement of the current pixel based on the square, the relative displacement and the difference.

14. The apparatus according to claim 13, wherein the processor, when executing the computer-readable instructions, implements operation comprising:
determining the displacement of the current pixel by using the following equation:

$$V_p = \sum_{q \in w} \alpha(L_q - L_p) \frac{1}{\|q - p\|} V_{pq},$$

wherein p represents the coordinates of the current pixel, $V_p$ represents the displacement of the current pixel, q represents the coordinates of the target pixel, $V_{pq}$ represents the relative displacement, w represents the preset image region, a represents a parameter, ‖•‖ represents obtaining an absolute value, and Σ represents summation.

15. The apparatus according to claim 10, wherein the processor, when executing the computer-readable instructions, implements operations comprising:
filtering the first water ripple distortion image to obtain a second water ripple distortion image having a preset tone;
processing a color of the water ripple map to obtain a colored water ripple map; and
determining the water ripple effect image corresponding to the current image frame based on the second water ripple distortion image and the colored water ripple map.

16. The apparatus according to claim 15, wherein the processor, when executing the computer-readable instructions, implements operations comprising:
determining at least one color channel corresponding to each of pixels in the first water ripple distortion image; and
multiplying a color component of each of the at least one color channel by a preset coefficient, to obtain the second water ripple distorting image having the preset tone.

17. The apparatus according to claim 15, wherein the processor, when executing the computer-readable instructions, implements operation comprising:
multiplying the water ripple map with a selected preset color to obtain the colored water ripple map.

18. The apparatus according to claim 15, wherein the processor, when executing the computer-readable instructions, implements operation comprising:
multiplying and blending the second water ripple distortion image with the colored water ripple map to obtain the water ripple effect image corresponding to the current image frame.

19. A non-transitory computer-readable storage medium storing non-transitory computer-readable instructions, the non-transitory computer-readable instructions, when executed by a computer, causing the computer to perform operations comprising:
obtaining a current image frame in an original video;
selecting a water ripple map corresponding to the current image frame from a pre-obtained water ripple map sequence;
determining displacements of respective pixels in the water ripple map, and forming a displacement vector diagram by using the displacements of the pixels;
determining coordinates of respective pixels in the current image frame based on the displacement vector diagram to obtain a first water ripple distortion image; and
determining a water ripple effect image corresponding to the current image frame based on the first water ripple distortion image and the water ripple map.

\* \* \* \* \*